(No Model.)
P. H. LEQUIRE.
PLOW.
No. 353,455. Patented Nov. 30, 1886.
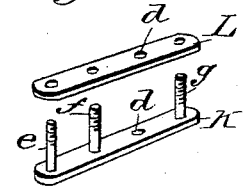
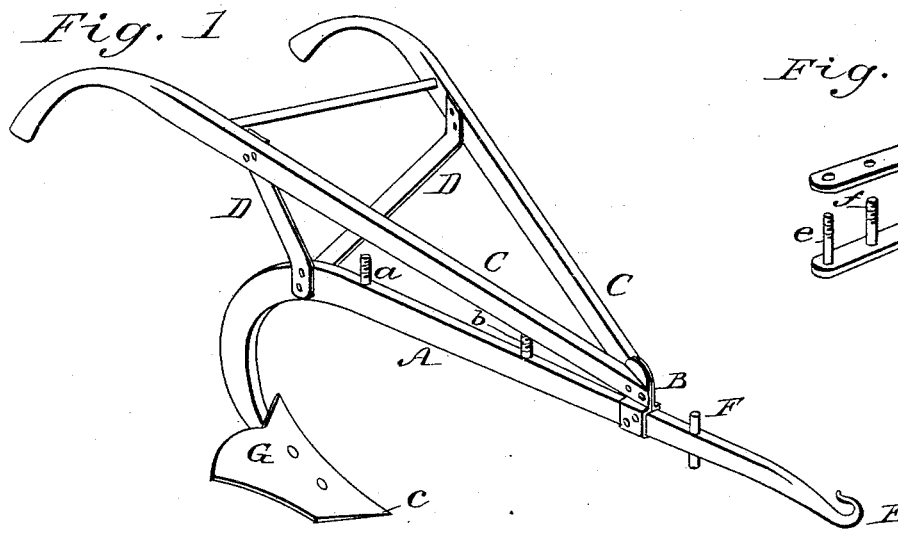
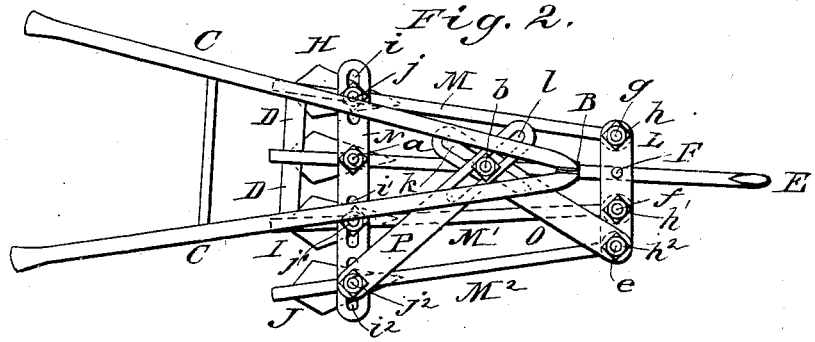
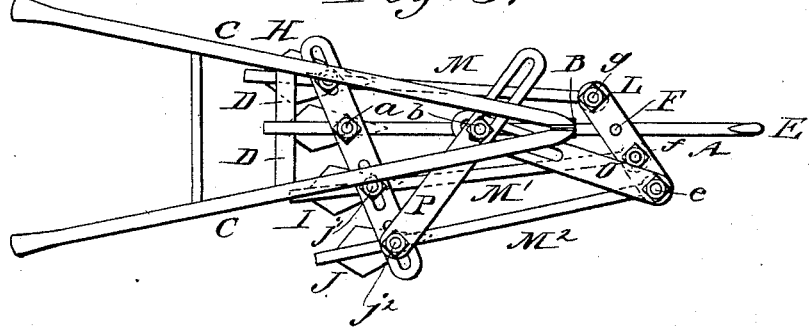
WITNESSES:
INVENTOR:
P. H. Lequire
BY Munn & Co.
ATTORNEYS.

UNITED STATES PATENT OFFICE.

PINKNEY H. LEQUIRE, OF GREENWOOD, ARKANSAS.

PLOW.

SPECIFICATION forming part of Letters Patent No. 353,455, dated November 30, 1886.

Application filed September 16, 1886. Serial No. 213,653. (No model.)

*To all whom it may concern:*

Be it known that I, PINKNEY HAMILTON LEQUIRE, of Greenwood, in the county of Sebastian and State of Arkansas, have invented a new and useful Improvement in Plows, of which the following is a specification, reference being had to the annexed drawings, forming a part thereof, in which—

Figure 1 is a perspective view of my improved plow. Fig. 2 is a plan view of the plow arranged as a cultivator. Fig. 3 is a plan view of the plow arranged as a side-hill plow or cultivator, and Fig. 4 is a perspective view of the device for connecting the auxiliary plows with the beam of the main plow.

Similar letters of reference indicate corresponding parts in the different figures of the drawings.

The object of my invention is to provide a plow which may be employed as a light ordinary plow, as a right or left double-shovel plow, and as a right or left side harrow or cultivator.

My invention consists in a plow provided with a curved beam, with handles attached thereto in the usual way, and auxiliary plows connected with the beam by means of the pivoted cross-bars, and held in the position of use by slotted pivotal braces, all as hereinafter more fully described.

To the curved beam A is secured a clip, B, to which are attached the forward ends of handles C, of the usual form. The rear ends of the handles are supported by braces D, attached to the inner surfaces of the handles and to opposite sides of the beam, near the downwardly-curved portion thereof. The forward end of the beam is provided with a hook, E, for receiving the ring of the single or double trees by which the plow is drawn forward. In the beam, forward of the clip B, is inserted a pin, F, which extends above and below the beam, and between the clip B and the braces D are inserted the screw-threaded studs $a\ b$.

To the lower end or standard of the curved beam A may be attached a mold-board or plow-share of any description. In Fig. 1 the beam A is represented as carrying an ordinary mold-board, G, having the point $c$ formed integrally therewith. Arranged in this way the plow is employed for ordinary light plowing; but when it is desired to use it as a cultivator or harrow the mold-board G is removed and replaced by cultivator-points, and one or more of the auxiliary plows H I J are connected with the beam by means of the bars K L. (Shown in Fig. 4.) These bars are provided with apertures $d$, for receiving the pin F, and the bar K carries three threaded bolts, $e\ f\ g$, which are received in corresponding holes in the bar L, the bolts $e\ f$ being located upon one side of the hole $d$, and the bolt $g$ upon the opposite side. The bars K L are clamped in position by nuts $h\ h'\ h^2$, received on the bolts $e\ f\ g$.

The plow H is provided with a short curved beam, M, similar in form to the beam A, which is apertured at its forward end to receive the bolt $g$. The beams M' M² of the plows I J are like the beam M of the plow H, and their apertured forward ends are received on the bolts $f\ e$.

Upon the stud $a$ is placed a cross-bar, N, provided with three slots, $i\ i'\ i^2$, in which are received studs $j\ j'\ j^2$, projecting upward from the beams M M' M², and provided with nuts which will clamp the beams in any desired position along the length of the slots of the bar N.

Upon the bolt $e$ is pivoted a brace, O, which is provided with a slot, $k$, which receives the stud $b$, and upon the stud $j^2$ of the beam M² is pivoted a brace, P, provided with a slot, $l$, which receives the stud $b$. A nut on the stud $b$ binds the braces O P in any desired position.

When the plow is to be used as an ordinary harrow or cultivator, the bars K L N are arranged at right angles to the beam A; but when it is desired to use it as a side cultivator the bars K L N are turned on the stud $a$ and pin F, so as to arrange the plows diagonally, as shown in Fig. 3.

By removing one or the other of the plows H I J and changing the adjustment of the braces O P the implement may be adapted to a great variety of work.

Having thus fully described my invention, I claim as new and desire to secure by Letters Patent—

1. The combination, with the beam A and plow carried thereby, of the bars L K N, pivotally connected with the beam, the auxiliary beams M M' M², carrying the plows H I J, and means, substantially as shown and described, for holding the transverse bars in the position of use.

2. The combination, with the plow-beam A, provided with the pin F and studs $a\,b$, and carrying a mold-board on the curved end thereof, of the cross-bar K, provided with the aperture $d$ and bolts $e\,f\,g$, the bar L, provided with the aperture $d$ and apertured to receive the bolts $e\,f\,g$, the slotted bar N, pivoted on the stud $a$, the plow-beams M M' M², pivoted on the bolts $e\,f\,g$, and provided with studs $j\,j'\,j^2$, inserted in the slots of the bar N, and the plows H I J, carried by the beams M M' M², substantially as shown and described.

3. The combination, with the plow-beam A, provided with the pin F and studs $a\,b$, and carrying a mold-board on the curved end thereof, of the cross-bar K, provided with the aperture $d$ and bolts $e\,f\,g$, the bar L, provided with the aperture $d$ and apertured to receive the bolts $e\,f\,g$, the slotted bar N, pivoted on the stud $a$, the plow-beams M M' M², pivoted on the bolts $e\,f\,g$, and provided with studs $j\,j'\,j^2$, inserted in the slots of the bar N, the plows H I J, carried by the beams M M' M², and the braces O P, connected with the bars K L N, substantially as shown and described.

P. H. LEQUIRE.

Witnesses:
R. T. POWELL,
R. A. RAUN.